United States Patent [19]

Maruyamano et al.

[11] Patent Number: 4,738,344
[45] Date of Patent: Apr. 19, 1988

[54] FRICTION CLUTCH

[75] Inventors: Satoru Maruyamano; Hisao Ohtani, both of Toyota, Japan

[73] Assignee: Toyota Jidosha Kabushiki Kaisha, Aichi, Japan

[21] Appl. No.: 925,619

[22] Filed: Oct. 31, 1986

[30] Foreign Application Priority Data

Nov. 1, 1985 [JP] Japan .............................. 60-169622[U]
Nov. 1, 1985 [JP] Japan .............................. 60-169623[U]

[51] Int. Cl.$^4$ ........................ F16D 13/50; F16D 13/71
[52] U.S. Cl. ............................ 192/109 R; 192/110 R
[58] Field of Search ................ 192/70.18, 70.28, 89 B, 192/98, 109 R, 110 R

[56] References Cited

U.S. PATENT DOCUMENTS

| | | | |
|---|---|---|---|
| 3,489,256 | 1/1970 | Binder et al. ........................... | 192/98 |
| 3,640,361 | 2/1972 | Spichala ................................ | 192/70.18 |
| 3,712,435 | 1/1973 | Kraus .................................... | 192/89 B X |
| 4,558,771 | 12/1985 | Després ................................ | 192/70.18 |
| 4,607,738 | 8/1986 | Muller .................................. | 192/109 R |
| 4,613,025 | 9/1986 | Després ................................ | 192/70.18 |
| 4,655,334 | 4/1987 | Valier ................................... | 192/89 B |

FOREIGN PATENT DOCUMENTS 59-77624  5/1984  Japan .

Primary Examiner—Rodney H. Bonck
Assistant Examiner—Richard M. Lorence
Attorney, Agent, or Firm—Parkhurst & Oliff

[57] ABSTRACT

A friction clutch wherein a clutch disc is disposed between a flywheel, and a pressure plate fixed to the flywheel via a clutch cover secured to the flywheel, such that the clutch disc is normally held in pressed contact with the flywheel and pressure plate, with the pressure plate biased by a diaphragm spring against the clutch disc. The diaphragm spring engages the clutch cover at its outer end and engages a releasing member at its inner end, such that the spring normally biases the pressure plate at its intermediate portion. The clutch disc is released from the flywheel and pressure plate when the releasing member is operated to free the pressure plate from the biasing action of the spring. The friction clutch has a stopper device for limiting a maximum permissible length of axial displacement of the pressure plate toward the clutch disc due to wear of the clutch disc. This length is determined to the smaller than X·a/b, where "X" is a distance between the releasing member and the clutch disc; "a" is a distance between a point of engagement of the spring with the clutch cover and a point of abutment of the spring on the pressure plate; and "b" is a distance between points of engagement of the spring with the clutch cover and releasing member.

11 Claims, 3 Drawing Sheets

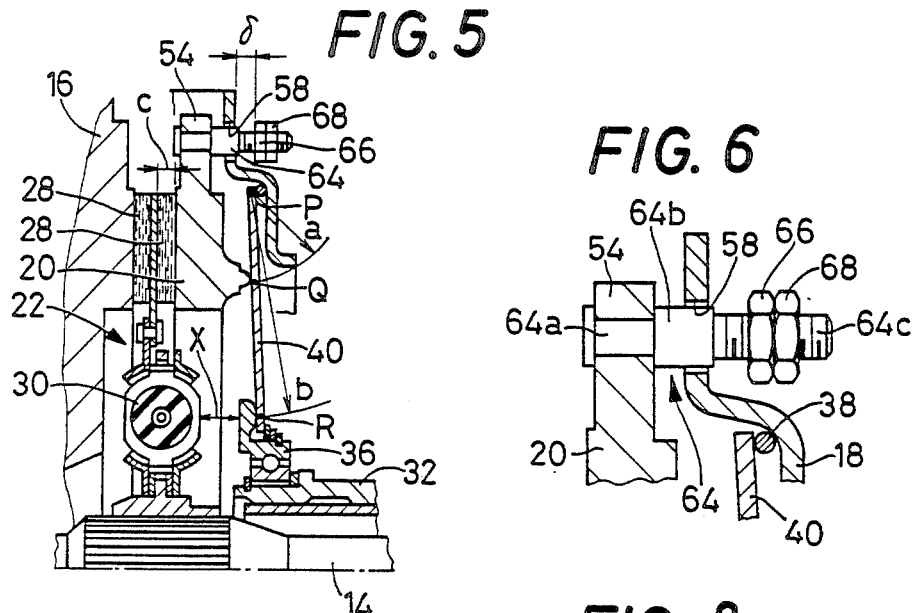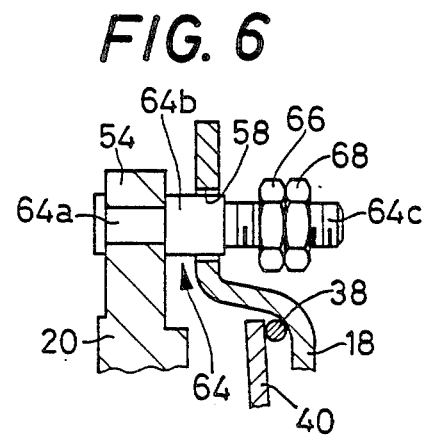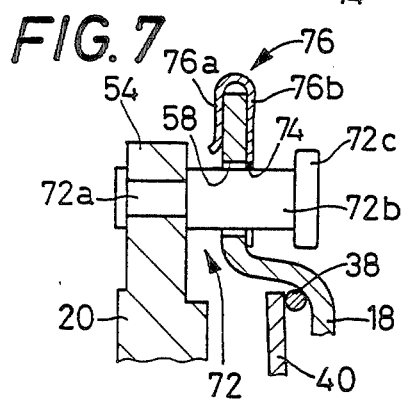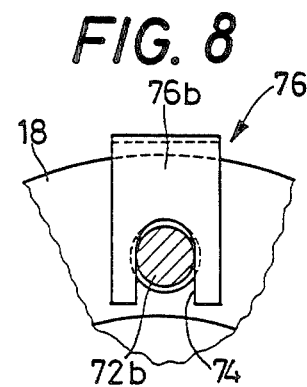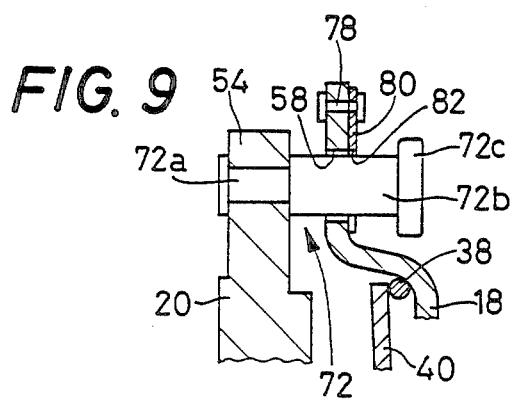

FRICTION CLUTCH

BACKGROUND OF THE INVENTION

1. Field of the Invention

The present invention relates generally to a friction clutch, and more particularly to improvements in a friction clutch of the type wherein a clutch disc is disengaged from a flywheel by retracting a releasing member in a direction away from the clutch disc, against the biasing action of a diaphragm spring which acts on a pressure plate to hold the clutch disc in pressed contact with the flywheel.

2. Discussion of the Related Art

In the art of a power transmission system of an automotive vehicle, there is widely known a friction clutch for transmitting a torque from a driving member to a driven member, by means of frictional contact of the driven member with the driving member. An example of such a friction clutch includes (a) a flywheel as a driving member, (b) a clutch cover fixed to the flywheel, (c) a pressure plate disposed between the flywheel and the clutch cover such that the pressure plate is rotatable with the flywheel and clutch cover, and axially movable relative to these latter members, and (d) a diaphragm spring disposed between the clutch cover and a releasing member, such that an intermediate portion of the spring is abuttable on the pressure plate to bias the pressure plate in a forward direction toward the flywheel, for normally holding the clutch disc in pressed contact with the flywheel and the pressure plate, in order to transmit a torque from the flywheel to the clutch disc. The pressure plate is freed from the biasing action of the diaphragm spring by the retracting movement of the releasing member in the direction away from the flywheel, against the biasing force of the spring, whereby the clutch disc is disengaged from the flywheel and the pressure plate. Thus, the friction clutch is selectively placed in its operative and inoperative positions, or the torque is transmitted when needed, from the driving member in the form of the flywheel, to the driven member in the form of the clutch disc. The above friction clutch is called "pull type" wherein the releasing member is pulled to bring the clutch to its inoperative position.

In the friction clutch of the pull type as described above, the releasing member as well as the pressure plate is biased by the diaphragm spring in the forward direction toward the flywheel. Accordingly, if the clutch lining of the clutch disc is excessively worn, or damaged or substantially removed for some reason or other, the releasing member is displaced in the forward direction, together with the pressure plate. This displacement of the releasing member may cause a collision or interference between a release bearing of the releasing member and torsion members of the clutch disc, which bearing and torsion members are positioned closest to each other.

To avoid the above interference, it is proposed to provide the pressure plate with a stopper which is adapted to abut on the clutch cover, in order to prevent an excessive movement of the pressure plate toward the flywheel. Such a stopper is disclosed in Japanese Utility Model Application which was laid open in 1984 under Publication No. 59-77624. The friction clutch disclosed therein is of a push type wherein the releasing member is pushed forward to place the friction clutch in the inoperative position. The stopper indicated above is provided for the sole purpose of preventing plastic deformation of straps which are used to elastically connect the pressure plate to the clutch cover.

It is considered possible to use such a stopper in a friction clutch of the pull type, for limiting a movement of the straps relative to the clutch cover for protecting the straps from plastic deformation. Therefore, the movement of the pressure plate limited by the stopper is relatively large, and consequently the releasing member may collide with the clutch disc when the lining of the clutch disc is excessively worn or damaged. Thus, the use of the stopper in the pull type friction clutch according to the concept disclosed in the above-identified Laid-Open Publication would not solve the problem of collision between the releasing member and the clutch disc.

Of course, it is possible to arrange the friction clutch such that the releasing member and the clutch disc are spaced apart from each other by a distance sufficient to avoid a collision therebetween, even when the pressure plate abuts on the flywheel via the clutch disc upon removal of the clutch lining, or on the stopper for protecting the straps from plastic deformation. In this case, however, it is inevitable that the friction clutch has an undesirably large axial dimension.

SUMMARY OF THE INVENTION

It is therefore an object of the present invention to provide an improved friction clutch of the pull type which has means for preventing an interference between the clutch disc and the releasing member, without increasing the axial dimension of the clutch, while allowing the clutch disc to serve its full expected life.

The above object is achieved by the present invention which provides a friction clutch comprising: (a) a flywheel; (b) a clutch cover fixed to the flywheel such that the clutch cover is rotatable with the flywheel; (c) a pressure plate disposed between the flywheel and the clutch cover, such that the pressure plate is rotatable with the flywheel and the clutch cover, and such that the pressure plate is axially movable relative to the flywheel and the clutch cover; (d) a clutch disc disposed between the flywheel and the pressure plate, rotatably and axially movably relative to the flywheel and the pressure plate; (e) a diaphragm spring engaging the clutch cover at a first point thereof, and having an intermediate portion which is abuttable on the pressure plate, for biasing the pressure plate in a first axial direction thereof toward the flywheel and thereby normally holding the clutch disc in pressed contact with the flywheel and the pressure plate, to transmit a torque from the flywheel to the clutch disc, the intermediate portion being abuttable on the pressure plate at a second point of the diaphragm spring away from the first point; (e) a releasing member engaging the diaphragm spring at a third point of the diaphragm spring such that the second point is located between the first and third points, the releasing member acting on the diaphragm spring against a biasing action of the spring, to free the pressure plate from the biasing action, thereby permitting the pressure plate to be moved in a second axial direction thereof opposite to the first axial direction, and consequently releasing the clutch disc out of pressed contact with the flywheel and the pressure plate, to inhibit transmission of the torque from the flywheel to the clutch disc; and (f) a stopper device for limiting a maximum permissible length of displacement of the pressure plate in the first axial direction due to wear or damage of the clutch disc. The maximum permissible length of movement is determined so as to satisfy the following formula (1):

$$\delta < X \cdot a/b \tag{1}$$

where
- $\delta$: maximum permissible length of displacement of the pressure plate,
- X: distance between the releasing member and the clutch disc,
- a: distance between the first point and the second point of the diaphragm spring, and
- b: distance between the first point and the third point of the diaphragm spring.

In the friction clutch of the present invention constructed as described above, the stopper device prevents a further axial displacement of the pressure plate after the pressure plate has been displaced toward the flywheel by the maximum permissible length $\delta$ due to wear of the friction clutch. As a result of the above axial displacement of the pressure plate in the first axial direction, the releasing member is also displaced in the same direction by a distance equal to $\delta \cdot b/a$. Since the distance X at the time the length $\delta$ is determined is larger than the distance $\delta \cdot b/a$ as is understood from the formula (1), the displacement of the releasing member caused by the maximum permissible length $\delta$ of displacement of the pressure plate will not cause the releasing member to collide with the clutch disc.

According to the invention, therefore, the releasing member is stopped by the stopper device before the releasing member comes into collision with the clutch disc, even when the releasing member is axially displaced toward the clutch disc, together with the axial displacement of the pressure plate due to excessive wear or damage of the clutch disc, for example. Thus, the stopper device protects the releasing member and the clutch disc, more specifically, the closest two portions or parts of these members, for example, a release bearing of the releasing member and elastic torsion members of the clutch disc.

As described above, the maximum length of axial displacement of the pressure plate is determined based on the distance X between the releasing member and the clutch disc, so as to avoid the interference therebetween. This arrangement makes it possible to reduce the distance X and therefore the axial dimension of the friction clutch, as compared with that in a conventional arrangement wherein the releasing member and the clutch disc are spaced apart by a relatively large distance enough to avoid the interference therebetween when the pressure plate comes into abutment on the flywheel via the clutch disc, or when the pressure plate comes into abutment on a stopper provided for protecting the elastic straps from plastic deformation due to excessive elastic flexture. Thus, the stopper device prevents a collision or interference between the clutch disc and the releasing member, while minimizing the axial dimension of the friction clutch.

If the maximum permissible length $\delta$ of the pressure plate is too small, the pressure plate is prevented from forcing the clutch disc against the flywheel before the expected service life of the clutch disc (linings of the clutch disc) is reached. Accordingly, it is preferred that the maximum permissible length of displacement of the pressure plate is greater than a maximum permissible amount of wear of the lining member of the clutch disc.

That is, according to a preferred feature of the invention, the maximum permissible length $\delta$ is determined so as to satisfy the following formula (2):

$$2y < \delta < X \cdot a/b \tag{2}$$

where, 2y: maximum permissible total amount of wear of
a pair of linings of the lining member.

In the case where the strap means is used to elastically connect the pressure plate to the clutch cover, it is desirable that the stopper device is associated with the pressure plate and the clutch cover, so as to limit an amount of axial movement of the pressure plate relative to the clutch cover. In this case, the axial displacement of the pressure plate relative to the clutch cover is limited by the stopper device, even before the clutch cover is installed, i.e., attached to the flywheel. Therefore, the stopper device is useful for protecting the strap means from plastic deformation due to excessive elastic deformation caused by excessive relative displacement between the pressure plate and the clutch cover, during assembling of the friction clutch.

According to another advantageous feature of the invention, the friction clutch further comprises adjusting means associated with the stopper device, for adjusting the maximum permissible length of displacement of the pressure plate. This adjusting means is effective for changing or establishing the maximum permissible length of displacement of the pressure plate, depending upon the specific thicknesses of the clutch disc, pressure plate and other components of the clutch. Further, the adjusting means is useful for accommodating cumulative dimensional and positioning errors of the components of the clutch, during assembling of the clutch.

In one form of the above feature of the invention, the clutch cover has a plurality of holes formed therethrough, and the stopper device comprises a plurality of stopper pins each of which has a first portion fixed to the pressure plate, and a second portion extending through corresponding one of the holes in the clutch cover. The second portion has an externally threaded part, and the stopper device further comprises a plurality of nuts engaging the externally threaded parts of the corresponding stopper pins. The nuts have an external size larger than a size of the holes, so that the nuts are abuttable on the clutch cover. In this case, the externally threaded parts of the stopper pins and the nuts also serve as the adjusting means.

In another form of the above feature of the invention, the clutch cover has a plurality of holes formed therethrough, and the stopper device comprises a plurality of stopper pins each of which has a first portion fixed to the pressure plate, a second portion extending through corresponding one of the holes in the clutch cover, and a flange portion is formed at an end of the second portion remote from the first portion. The flange portion extends radially from the second portion and has a diameter larger than that of the holes. In this case, the adjusting means comprises spacer means secured to the clutch cover such that the flange portion is abuttable on the spacer means due to movement of the pressure plate in the first axial direction.

In the above form of the invention, the spacer means may have a notch through which the second portion of the stopper pins extends. In this instance, the spacer means may consist of a single member which has a fixing portion secured to the clutch cover by an elastic force thereof, and a generally planar spacer portion which has the notch. Alternatively the spacer means may consist of a generally planar spacer member which has the notch and which is secured to the clutch cover by fastening means.

BRIEF DESCRIPTION OF THE DRAWINGS

The above and other objects, features and advantages of the present invention will become more apparent by reading the following description of preferred embodiments of the invention, when considered in conjunction with the accompanying drawings, in which:

FIG. 5 is a fragmentary cross sectional view of another embodiment of the invention;

FIG. 6 is an enlarged cross sectional view of a stopper device of the friction clutch of FIG. 5;

FIG. 7 is an enlarged cross sectional view of a stopper device of a further embodiment of the invention;

FIG. 8 is a fragmentary right-hand side elevation of FIG. 7, illustrating a stopper pin with its flange portion removed; and FIG. 9 is a fragmentary enlarged cross sectional view corresponding to that of FIG. 8, showing a stopper device of a still further embodiment of the invention.

DETAILED DESCRIPTION OF THE PREFERRED EMBODIMENTS

Figure 1:
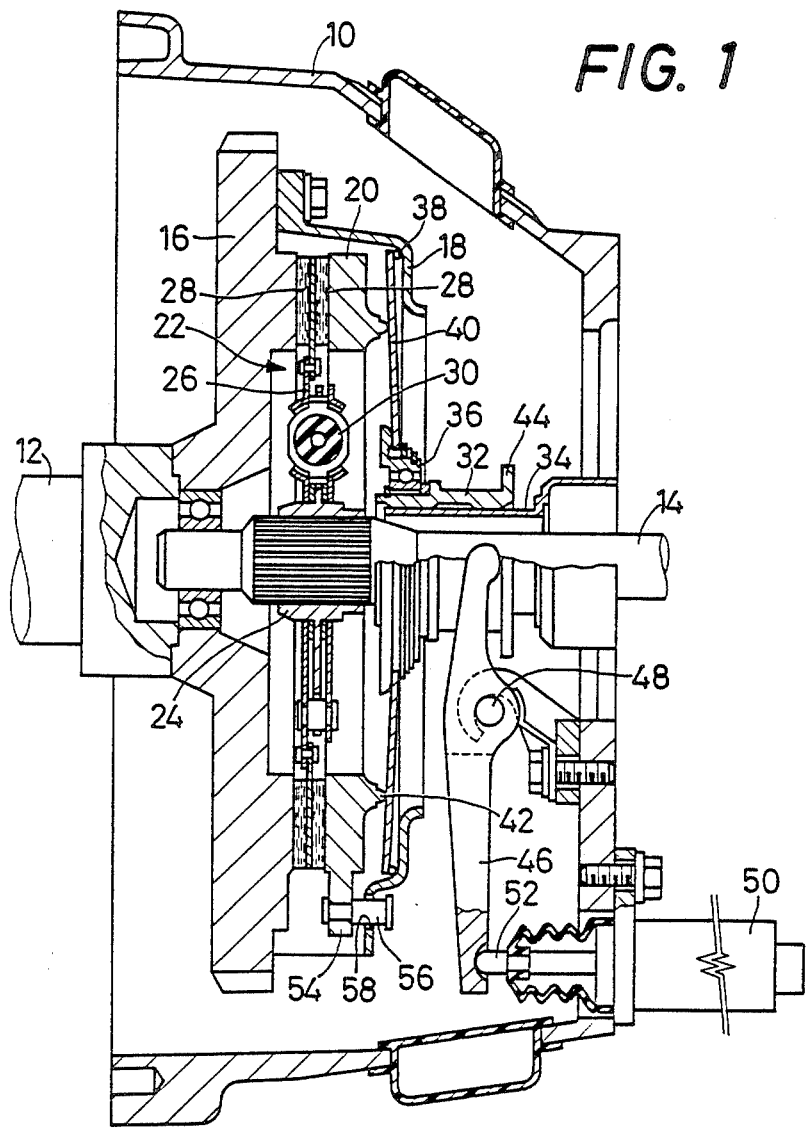
FIG. 1 is an elevational view in cross section of one embodiment of a friction clutch of the invention, incorporated in a power transmission system of an automotive vehicle.
Figure 2:
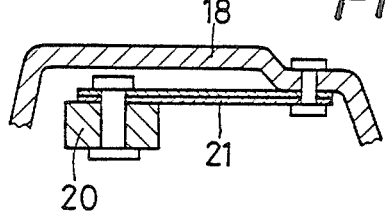
FIG. 2 is an elevational view in cross section of a strap used in the friction clutch of FIG. 1.
Figure 3:
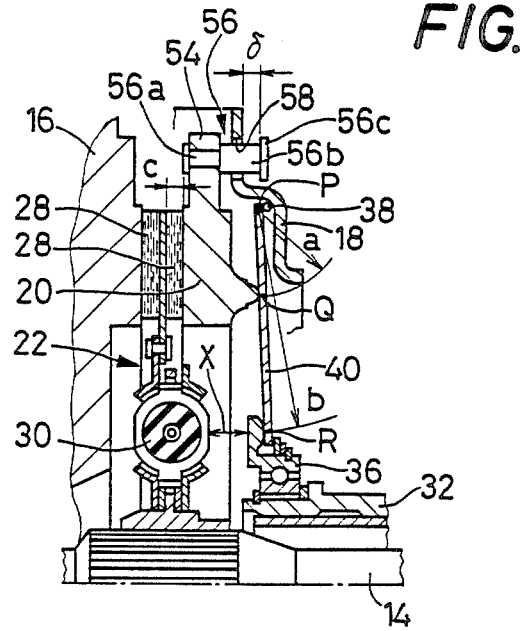
FIG. 3 is a fragmentary enlarged view in cross section of some parts of the friction clutch of FIG. 1.

Referring first to FIGS. 1-3, there is shown a friction clutch incorporated in a power transmission system of an automotive vehicle, wherein opposed ends of a crankshaft 12 of the vehicle engine and an output shaft 14 of the clutch are supported within a housing 10 of the friction clutch. The crankshaft 12 and the output shaft 14, which are aligned with each other, are rotatable relative to each other. A disc-like flywheel 16 is fixed to the above-indicated end of the crankshaft 12, such that the flywheel 16 is rotatable with a clutch cover 18 secured thereto. Within an assembly of the flywheel 16 and the clutch cover 18, there is supported a pressure plate 20 such that the pressure plate 20 is rotatable with the flywheel 16 and clucth cover 18, and axially movable relative to these members 16, 18. As shown in FIG. 2, the pressure plate 20 is connected to the clutch cover 18 by strap means in the form of a plurality of elastic straps 21 which are arranged in evenly spaced-apart relation with each other, in the circumferential direction of the clutch cover 18. Each strap 21 is secured at its opposite ends to the clutch cover 18 and the pressure plate 20. Thus, the pressure plate 20 is supported by the clutch cover 18 so that the plate 20 is axially movable relative to the cover 18 due to elasticity of the straps 21.

A clutch disc 22 is mounted on the output shaft 14, adjacent to its end within the housing 10, such that the disc 22 is rotatable with the output shaft 14, and axially movable relative to the output shaft 14. The clutch disc 22 includes a hub 24 splined on the output shaft 14, and a friction disc 26 disposed between the flywheel 16 and the pressure plate 20. The friction disc 26 has a pair of opposite clutch linings 28, 28 which face the flywheel 16 and the pressure plate 20. The clutch disc 22 further includes a plurality of elastic torsion members 30 which elastically connect the friction disc 26 to the hub 24. The torsion members 30 are equiangularly spaced apart from each other in the circumferential direction of the friction disc 26. While the clutch disc 22 is placed in its operative position as described later in detail, the clutch linings 28, 28 of the friction disc 26 are held in pressed contact with the flywheel 16 and the pressure plate 20, so that a torque is transmitted from the crankshaft 12 to the friction disc 26 through frictional contact of the linings 28, 28 with the flywheel and cover 16, 18. The torque transmitted to the friction disc 26 is imparted to the output shaft 14 via the elastic torsion members 30 and the hub 24.

On one side of the clutch disc 22 remote from the flywheel 16, there is disposed a stationary sleeve 34. A release hub 32 is axially slidably mounted on this stationary sleeve 34. The release hub 32 has a release bearing 36 fixed to its front end adjacent to the hub 24 of the clutch disc 22. The release bearing 36 cooperates with a pivot ring 38 fixed to the clutch cover 18, to support a diaphragm 40 disposed within the clutch cover 18. More specifically, the diaphragm spring 40 is connected at its outer periphery (as indicated at P in FIG. 3) to the pivot ring 38 of the clutch cover 18, and at its inner periphery (as indicated at R in FIG. 3) to the release bearing 36 of the release hub 32.

The diaphragm spring 40 consists of a belleville or coned disc spring whose inner portion projects in the left direction as seen in FIG. 1, when the spring is in a free state. The diaphragm spring 40 has an intermediate portion which is normally held in abutting contact with a tab 42 formed on the pressure plate 20, as indicated at Q in FIG. 3. In this arrangement, the clutch disc 22 is normally held in pressed contact with the flywheel 16 and the pressure plate 20, with the pressure plate 20 forced against the clutch disc 22 under the biasing action of the diaphragm spring 40 in a first direction toward the flywheel 16, as shown in FIG. 1. That is, the clutch disc 22 is placed in the operative position in which the torque is transmitted from the crankshaft 12 to the output shaft 14 of the friction clutch. This is the operative state of the friction clutch.

The release hub 32 is formed with a flanged rear end 44 remote from the release bearing 36. This flanged end 44 engages the operating end of a release fork 46 which is supported pivotally about a pin 48. The other end of the release fork 46 remote from the operating end is held in engagement with a piston rod 52 of a releasing cylinder 50. Upon depression of a clutch pedal provided on the vehicle, the releasing cylinder 50 is actuated, with its piston rod 52 extending to pivot the release fork 46 clockwise about the pivot pin 48. Accordingly, the release hub 32 is slidably moved on the sleeve 34 in a direction away from the flywheel 16, against the biasing force of the diaphragm spring 40. As a result, the pressure plate 20 which has been biased by the spring 40, is returned to its inoperative position by an elastic return force of the straps 21, in a second axial direction away from the flywheel 16 and clutch disc 22. Thus, the pressure plate 20 is freed from the biasing action of the diaphragm spring 40, and the clutch disc 22 is released out of frictional pressed engagement with the flywheel and pressure plate 16, 20. This is the inoperative state of the clutch disc 22 and the friction clutch. As indicated above, the present friction clutch is of a pull release type wherein the clutch is disengaged by pulling the release hub 32. In the present embodiment, the release hub 32 with the release bearing 36 engaging the diaphragm spring 40 serves as a releasing member operated to free the pressure plate 20 from the biasing action of the spring 40 and thereby disengage the friction clutch, as described above.

The pressure plate 20 has a plurality of radial projections 54 which are formed so as to extend in the radially outward direction of the plate. The radial projections 54 are evenly spaced from each other in the circumferential direction of the pressure plate 20. On the other hand, the clutch cover 18 has a plurality of holes 58 formed through its thickness, such that the holes 58 are aligned with the radial projections 54 of the pressure plate 20. As most clearly shown in FIG. 3, each of the radial projections 54 supports a stopper pin 56 fixed thereto. The stopper pin 56 has a first portion 56a fixed to the radial projection 54, a second portion 56b extending through the corresponding hole 58 formed in the clutch cover 18, and a flange portion 56c formed at the end of the second portion 56b. The flange portion 56c has a diameter larger than that of the hole 58. The stopper pins 56 serve as a stopper device for limiting a maximum permissible length $\delta$ of axial displacement of the pressure plate 20 due to wear or damage of the clutch disk 22. Namely, the stopper device 56 determines a distance $\delta$ between the inner surface of the flange portion 56c of the stopper pins, and the outer surface of the clutch cover 18 where the clutch disc 22 in its fresh or unused state is placed in its operative position. This length or distance $\delta$ is selected so as to satisfy the formula (2) previously indicated.

Described in more detail, the length $\delta$ is selected to be smaller than X·a/b but larger than 2y, where:

X = distance between the release bearing 36 and the elastic torsion members 30 (distance between the closest parts or portions of the releasing member and the clutch disc 22).

a = distance between the point of engagement P of the diaphragm spring 40 with the pivot ring 38 of the clutch cover 18, and the point of abutment Q of the diaphragm spring 40 on the tab 42 on the pressure plate 20.

b = distance between the point of engagement P of the diaphragm spring 40, and the point of engagement R of the spring 40 with the release bearing 36 of the releasing member (32), and y = maximum permissible amount of wear of each of the two clutch linings 28, 28.

In the instant friction clutch constructed as described above, the stopper pins 56 limit the axial displacement of the pressure plate 20 due to wear or damage of the clutch linings 28, 28 of the clutch disc 22 during service of the clutch. In other words, the flange portion 56c of the stopper pins 56 comes into abutting contact with the outer surface of the clutch cover 18, when the axial displacement of the pressure plate 20 has reached the predetermined length or distance $\delta$, which is the maximum permissible value. As a result of this axial displacement, the release bearing 36 is displaced forward toward the clutch disc 22 by a distance of $\delta$·b/a. Since the distance X between the release bearing 36 and the torsion members 30 is greater than the distance of $\delta$·b/a, the above displacement of the release bearing 36 with the pressure plate 20 will not result in an interference between the release bearing 36 and the torsion members 30.

As described above, the maximum length of axial displacement of the pressure plate 20 is determined based on the distance X between the release bearing 36 and the torsion members 30, so as to avoid the interference therebetween. This arrangement makes it possible to reduce the distance X and therefore the axial dimension of the friction clutch, as compared with that in a conventional arrangement wherein the releasing member and the clutch disc are spaced apart by a relatively large distance enough to avoid the interference therebetween when the pressure plate comes into abutment on the flywheel via the clutch disc, or on a stopper provided for protecting the elastic straps from plastic deformation due to excessive elastic flexture.

The limited axial displacement of the pressure plate 20 by the stopper device 56 means on accordingly limited axial displacement of the straps 21. That is, the stopper device 56 protects the elastic straps 21 from plastic deformation due to excessive elastic flexture caused by excessive wear of the clutch linings 28, which plastic deformation would cause a failure of the straps 21 to correctly return the pressure plate 21 to its inoperative or rest position when the friction clutch is disengaged. Another feature of the stopper device 56 lies in that the forward end of the pressure plate 20 relative to the clutch cover 18 is limited by means of abutment of the flange portion 56c of the stopper pins 56 on the clutch cover 18. Namely, the forward movement of the pressure plate 20 away from the clutch cover 18 is limited even before the clutch cover 18 is attached to the flywheel 20. Thus, the stopper pins 56 facilitate the assembling of the friction clutch, protecting the straps 21 from plastic deformation before and during the clutch assembling.

Further, since the maximum permissible length $\delta$ of axial displacement of the pressure plate 20 is larger than the maximum permissible sum 2y of wear of the two clutch linings 28, 28 of the clutch disc 22, the pressure plate 20 may be displaced toward the flywheel 16 until the maximum wear of the linings 28 is reached. Thus, the stopper device 56 permits the effective use of the linings 28 until they serve their full life.

Figure 4:
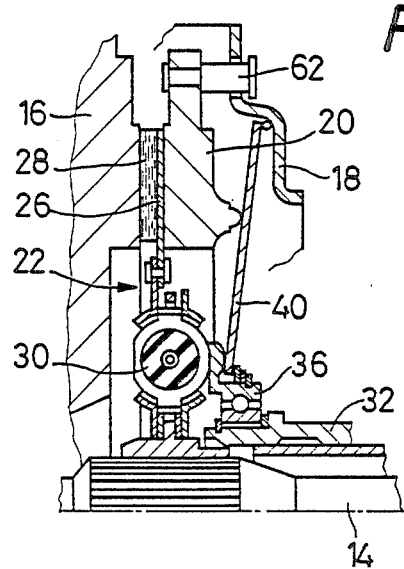
FIG. 4 is a fragmentary view of an example of a known friction clutch, showing an interference between a release bearing and an elastic torsion member.

FIG. 4 shows a conventional friction clutch wherein stopper pins 62 are provided merely for preventing plastic deformation of the straps of the pressure plate 20. If one of the clutch linings 28, 28 is substantially removed some reason or other, for example, the pressure plate 20 is moved toward the flywheel 16 by a distance equal to the thickness "c" of the broken lining 28. In this event, the release bearing 36 is moved by a distance of c·b/a. If this distance is greater than the distance X, the release bearing 36 comes into collision with the elastic torsion members 30, as shown in FIG. 4, causing these members to be damaged.

If both of the clutch linings 28, 28 of the conventional clutch of FIG. 4 are substantially removed and the pressure plate 20 is moved by a distance equal to the total thickness 2c of the two linings 28, the release bearing 36 is moved by a distance equal to 2c·b/a while at the same time the clucth disc 22 is moved by a distance equal to the thickness c until the disc 22 abuts on the flywheel 16. Therefore, if the distance 2c·b/a of movement of the release bearing 36 is greater than the distance X plus the thickness c i.e., (X+c), the release bearing 36 will collide with the torsion members 30. In this case, too, the bearing 36 and the torsion members 30 may be damaged.

Although the above-indicated collision between the release bearing 36 and the torsion members 30 may be avoided if these two members 36, 30 are positioned with a sufficiently large axial distance therebetween, this solution leads to an unnecessarily large axial dimension of the clutch cover 18, and therefore the clutch housing 10. Further, the above solution leads to increased difficulty of assemblying the friction clutch. For these reasons, the distance X in the conventional arrangement is held to a minimum that allows the pressure plate 20 to be advanced until the expected life of the clutch linings 28 is reached. Therefore, the conventional arrangement suffers from an interference between the release bearing 36 and the torsion members 30 when the clutch linings 28 are excessively worn or damaged or substantially removed.

Referring next to FIGS. 5–9, modified embodiments of the present invention will be described. In the interest of brevity and simplification, the same reference numerals as used in FIGS. 1–3 will be used in these figures to identify the corresponding components, and repeated description of these components will not be provided.

There is shown in FIGS. 5 and 6 one of the stopper pins 64 used in one modified arrangement of the friction clutch. Each stopper pin 64 has a first portion 64a fixed to the radial projection 54 of the pressure plate 20, a second portion 64b which extends through the hole 58 formed in the clutch cover 18, and an externally threaded portion 64c. A pair of internally threaded nuts 66, 68 are threaded on the externally threaded portion 64c of the stopper pin 64. The nuts 66, 68 have a size across flats, which is larger than the diameter of the hole 58. The inner nut 66 is adapted to come into abutment on the outer surface of the clutch cover 18 when the maximum permissible length of displacement of the pressure plate 20 is reached. The position of the nut 66 which determines the above maximum permissible length, is adjustable by returning the nut 66 in the suitable direction. The nut 68 is provided for locking the adjustable nut 66 in position. Thus, the nut 66 permits adjustment of the maximum permissible length of displacement of the pressure plate 20, depending upon the thickness of the linings 28, 28, or for accommodating a cumulative error of the components of the friction clutch during manufacture and assembling. In this modified embodiment, the nut 66 which cooperates with the stopper pin 64 to constitute a stopper device, also serves as an adjusting member for making the adjustment described above.

A further modified embodiment shown in FIGS. 7 and 8 uses stopper pins 72 similar to the stopper pins 56 of the first embodiment of FIGS. 1–3. Each stopper pin 72 has a first portion 72a secured to the pressure plate 20, a second portion 72b extending through the hole 58 in the clutch cover 18, and a flange portion 72c formed at the end of the second portion 72b. However, this embodiment uses a spacer member 76 for each stopper pin 72. The spacer member 76 has a fixing portion 76a secured to the clutch cover 18, and a generally planar spacer portion 76b which is held in contact with the outer surface of the clutch cover 18 and which has a notch 74. The spacer member 76 is positioned so that the second portion 72b extends through the notch 74, and so that the flange portion 72c of the stopper pin 72 is abuttable on the spacer portion 76b of the spacer member 76. By changing the thickness of the spacer member 76, the maximum permissible length of displacement of the preseure plate 20 can be adjusted. Thus, the spacer member 76 serves as an adjustable member.

A modified spacer member 80 is used in another embodiment of the invention shown in FIG. 9. This spacer member 80 consists of a generally planar member which is secured to the clutch cover 18 by a rivet 78 such that the spacer member 80 is held in contact with the outer surface of the clutch cover 18. The spacer member 80 has a notch 82 through which the second portion 72b of the stopper pin 72 extends. As in the embodiment of FIGS. 7 and 8, the maximum permissible length of displacement of the pressure plate 20 can be varied by changing the thickness of the spacer member 80. Thus, the spacer member 80 serves as an adjusting member for the stopper device.

While the present invention has been described in its preferred embodiment, it is to be understood that the invention is by no means limited to the precise details of the illustrated embodiment, but may be otherwise embodied.

In the illustrated embodiments, the straps 21 are used for flexibly connecting the pressure plate 20 to the clutch cover 18. However, the pressure plate 21 may be directly connected to and driven by the clutch cover 18.

As another modification, it is possible to attach the pressure plate 20 to the clutch cover 18, by utilizing the stopper pins 56, 64, 72 which serve as a stopper device.

In the illustrated embodiments, the stopper pins 56, 64, 72 are fixed to the pressure plate 20, the stopper pins may be fixed to the clutch cover 18, and adapted to abut on the pressure plate 20. Further, it is possible to use stoppers in the form of protrusions or extensions formed on the flywheel 16 of pressure plate 20, for limiting the maximum permissible displacement of the pressure plate 20 due to wear or damage or breakage of the clutch disc 22.

While the dimension X indicates the distance between the release bearing 36 and the torsion members 30 in the illustrated embodiments, the distance δ the stopper device or the maximum permissible length of axial displacement of the pressure plate 20 must be determined based on a distance between the two closest members or portions of the clutch disc (22) and the releasing member (32). Namely, the principle of the present invention is practiced in order to avoid an interference between two members which would otherwise occur when the pressure plate is excessively displaced toward the flywheel due to excessive wear of the clutch disc 22, or damage or breakage of the disc 22 or other members of the clutch.

It will be obvious to those skilled in the art that other changes, modifications and improvements may be made in the invention, in the light of the foregoing teaching, without departing from the spirit and scope of the invention defined in the following claims.

What is claimed is:

1. A friction clutch comprising:
   a flywheel;
   a clutch cover fixed to said flywheel such that said clutch cover is rotatable with said flywheel;
   a pressure plate disposed between said flywheel and said clutch cover, such that said pressure plate is rotatable with said flywheel and said clutch cover, and such that said pressure plate is axially movable relative to said flywheel and said clutch cover;

a clutch disc disposed between said flywheel and said pressure plate, rotatably and axially movable relative to said flywheel and said pressure plate;

a diaphragm spring engaging said clutch cover at a first point thereof, and having an intermediate portion which is abuttable on said pressure plate, for biasing said pressure plate in a first axial direction thereof toward said flywheel and thereby normally holding said clutch disc in pressed contact with said flywheel and said pressure plate, to transmit a torque from said flywheel to said clutch disc, said intermediate portion being abuttable on said pressure plate at a second point of said diaphragm spring away from said first point;

a releasing member engaging said diaphragm spring at a third point of the diaphragm spring such that said second point is located between said first and third points, said releasing member acting on said diaphragm spring against a biasing action of the spring, to free said pressure plate from said biasing action, thereby permitting said pressure plate to be moved in a second axial direction thereof opposite to said first axial direction, and consequently releasing said clutch disc out of pressed contact with said flywheel and said pressure plate, to inhibit transmission of the torque from said flywheel to said clutch disc; and a stopper device for limiting a maximum permissible length of displacement of said pressure plate in said first axial direction due to wear or damage of said clutch disc, said maximum permissible length of movement being determined so as to satisfy the following formula:

$$\delta < X \cdot a/b$$

where,
- $\delta$: said maximum permissible length of displacement of said pressure plate,
- X: distance between said releasing member and said clutch disc,
- a: distance between said first point and said second point of said diaphragm spring, and
- b: distance between said first point and said third point of said diaphragm spring.

2. The friction clutch of claim 1, wherein said clutch disc comprises a lining member which has two linings, said linings being secured to opposite surfaces of said clutch disc which are normally held in pressed contact with said flywheel and said pressure plate under the biasing action of said diaphragm spring, said maximum permissible length of displacement of said pressure disc being greater than a maximum permissible amount of wear of said lining member of said clutch disc.

3. The friction clutch of claim 2, further comprising strap means for connecting said pressure plate to said clutch cover, said stopper device being associated with said pressure plate and said clutch cover, so as to limit an amount of axial movement of said pressure plate relative to said clutch cover.

4. The friction clutch of claim 3, further comprising adjusting means associated with said stopper device, for adjusting said maximum permissible length of displacement of said pressure plate.

5. The friction clutch of claim 4, wherein said clutch cover has a plurality of holes formed therethrough and said stopper device comprises a plurality of stopper pins each of which has a first portion fixed to said pressure plate, and a second portion extending through a corresponding one of said holes in said clutch cover, said second portion hving an externally threaded part, said stopper device further comprising a plurality of nuts engaging the externally threaded parts of the corresponding stopper pins, said nuts having an external size larger than a size of said holes, said externally threaded parts of said stopper pins and said nuts also serving as said adjusting means.

6. The friction clutch of claim 4, wherein said clutch cover has a plurality of holes formed therethrough, and said stopper device comprises a plurality of stopper pins each of which has a first portion fixed to said pressure plate, a second portion extending through a corresponding one of said holes in said clutch cover, and a flange portion formed at an end of said second portion remote from said first portion, said flange portion extending radially from said second portion and having a diameter larger than that of said holes, said adjusting means comprising spacer means secured to said clutch cover such that said flange portion is abuttable on said spacer means due to movement of said pressure plate in said first axial direction.

7. The friction clutch of claim 6, wherein said spacer means has a notch through which said second portion of said stopper pins extends.

8. The friction clutch of claim 7, wherein said spacer means consists of a single member which has a fixing portion secured to said clutch cover by an elastic force thereof, and a generally planar spacer portion which has said notch.

9. The friction clutch of claim 7, wherein said spacer means consists of a generally planar spacer member which has said notch and which is secured to said clutch cover by fastening means.

10. The friction clutch of claim 2, wherein each one of said two linings of said lining member has an axial thickness, and wherein said maximum permissible length of movement is further determined to be less than said axial thickness of each one of said two linings of said lining member.

11. A friction clutch comprising:

a flywheel;

a clutch cover fixed to said flywheel such that said clutch cover is rotatable with said flywheel;

a pressure plate disposed between said flywheel and said clutch cover, such that said pressure plate is rotatable with said flywheel and said clutch cover, and such that said pressure plate is axially movable relative to said flywheel and said clutch cover;

a clutch disc disposed between said flywheel and said pressure plate, rotatably and axially movable relative to said flywheel and said pressure plate, said clutch disc including a plurality of elastic torsion members, said torsion members defining the axially outermost extent of said clutch disc;

a diaphragm spring engaging said clutch cover at a first point thereof, and having an intermediate portion which is abuttable on said pressure plate, for biasing said pressure plate in a first axial direction thereof toward said flywheel and thereby normally holding said clutch disc in pressed contact with said flywheel and said pressure plate, to transmit torque from said flywheel to said clutch disc, said intermediate portion being abuttable on said pressrue plate at a second point of said diaphragm spring away from said first point;

a releasing member engaging said diaphragm spring at a third point of the diaphragm spring such that said second point is located between said first and third points, said releasing member acting on said diaphragm spring against a biasing action of the spring, to free said pressure plate from said biasing action, thereby permitting said pressure plate to be moved in a second axial direction thereof opposite to said first axial direction, and consequently releasing said clutch disc out of pressed contact with said flywheel and said pressure plate, to inhibit transmission of torque from said flywheel to said clutch disc; and a stopper device for limiting a maximum permissible length of displacement of said pressure plate in said first axial direction due to wear or damage of said clutch disc, said maximum permissible length of movement being determined so as to satisfy the following formula:

$$\delta < X \cdot a/b$$

where,
- $\delta$: maximum permissible length of displacement of said pressure plate,
- $X$: distance between said releasing member and said elastic torsion members of said clutch disc,
- $a$: distance between said first point and said second point of said diaphragm spring, and
- $b$: distance between said first point and said third point of said diaphragm spring.

* * * * *